US010246922B2

(12) United States Patent
Mora et al.

(10) Patent No.: US 10,246,922 B2
(45) Date of Patent: Apr. 2, 2019

(54) DAMPENER FOR AN APPLIANCE

(71) Applicant: Haier US Appliance Solutions, Inc., Wilmington, DE (US)

(72) Inventors: Adam Raymond Mora, La Grange, KY (US); Michael Wuttikorn Ekbundit, Mount Washington, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 163 days.

(21) Appl. No.: 15/462,953

(22) Filed: Mar. 20, 2017

(65) Prior Publication Data
US 2018/0266156 A1 Sep. 20, 2018

(51) Int. Cl.
*E05F 3/16* (2006.01)
*E06B 3/38* (2006.01)
*F16F 9/14* (2006.01)
*D06F 39/14* (2006.01)
*E05D 11/08* (2006.01)

(52) U.S. Cl.
CPC ............. *E05F 3/16* (2013.01); *D06F 39/14* (2013.01); *E05D 11/082* (2013.01); *E06B 3/38* (2013.01); *F16F 9/145* (2013.01); *E05Y 2900/312* (2013.01); *F16F 2232/02* (2013.01)

(58) Field of Classification Search
CPC .... E05F 3/16; D06F 39/14; E06B 3/38; F16F 9/145; F16F 2232/02
See application file for complete search history.

(56) References Cited

U.S. PATENT DOCUMENTS

| 6,213,881 | B1 | 4/2001 | Sasa et al. |
| 6,840,355 | B2 | 1/2005 | Iwashita |
| 7,243,398 | B2 | 7/2007 | Salice |
| 8,459,754 | B2 | 6/2013 | Cho et al. |
| 8,511,115 | B2 | 8/2013 | Kim et al. |
| 9,290,880 | B2 | 3/2016 | Park et al. |
| 2003/0150678 | A1 | 8/2003 | Iwashita |
| 2010/0205774 | A1* | 8/2010 | Yoshida ............... A47K 13/12 16/250 |
| 2011/0018408 | A1* | 1/2011 | Cho ........................ D06F 39/14 312/228 |
| 2011/0062837 | A1* | 3/2011 | Kim ....................... D06F 23/04 312/228 |
| 2014/0116097 | A1 | 5/2014 | Park et al. |
| 2014/0125210 | A1* | 5/2014 | Park ....................... D06F 39/14 312/319.1 |
| 2015/0008808 | A1* | 1/2015 | Kim ....................... D06F 39/14 312/228 |

(Continued)

FOREIGN PATENT DOCUMENTS

| CN | 101525830 B | 7/2011 |
| WO | WO2009091132 A2 | 7/2009 |
| WO | WO2012153952 A2 | 11/2012 |

Primary Examiner — Daniel J Rohrhoff
(74) Attorney, Agent, or Firm — Dority & Manning, P.A.

(57) ABSTRACT

A dampener, and an appliance with a dampener, wherein the dampener provides resistance against the movement of a door of the appliance between an open and closed position. The dampener can be incorporated into the door of the appliance in manner than provides strength for proper operation while also allowing for streamlined aesthetics and less bulk.

10 Claims, 14 Drawing Sheets

(56) References Cited

U.S. PATENT DOCUMENTS

| | | | |
|---|---|---|---|
| 2015/0252508 A1* | 9/2015 | Kim | D06F 29/00 |
| | | | 68/27 |
| 2015/0267337 A1 | 9/2015 | Kim et al. | |
| 2017/0314633 A1* | 11/2017 | Mihara | E05F 3/20 |
| 2018/0187363 A1* | 7/2018 | Jang | D06F 39/14 |

\* cited by examiner

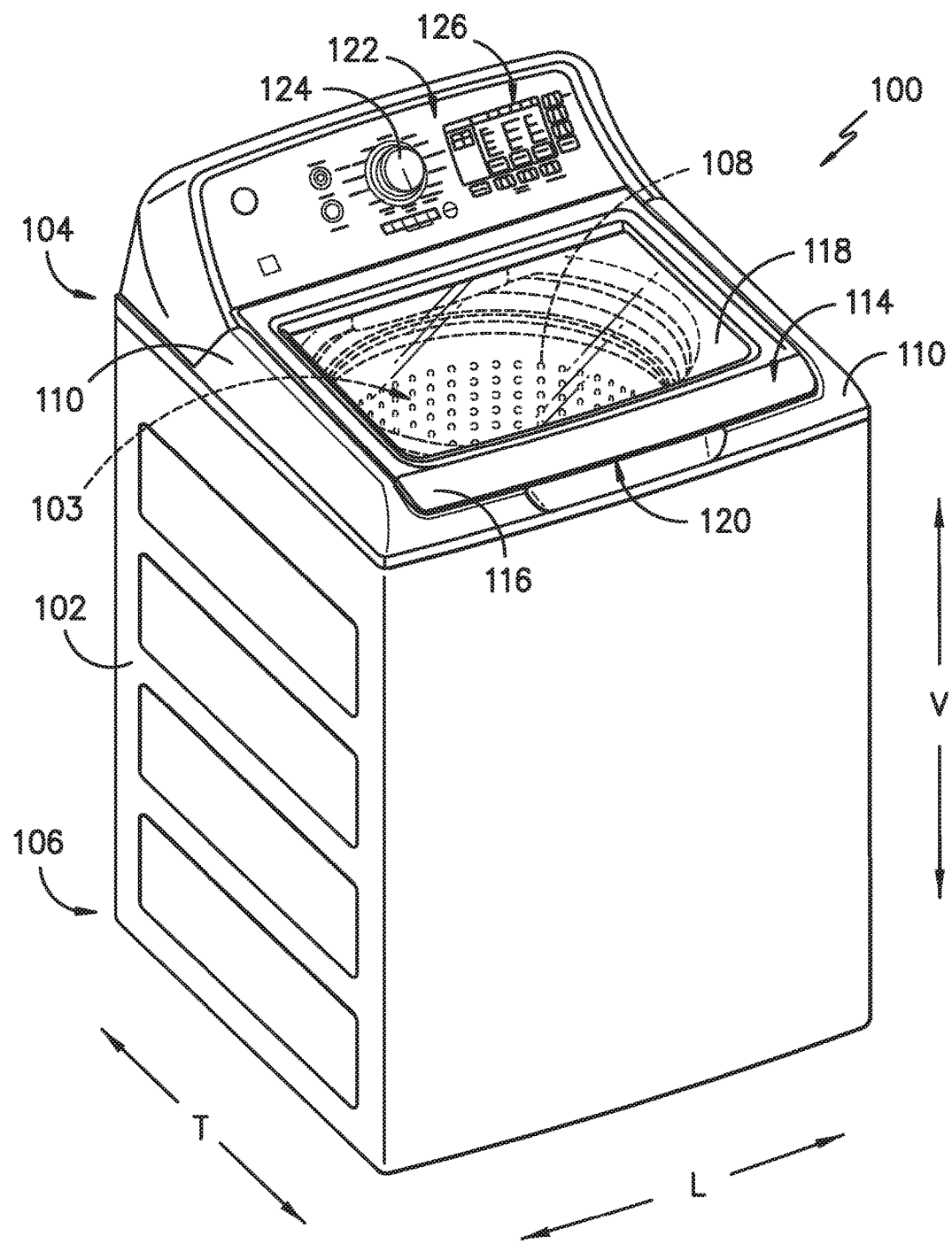
FIG. -1-

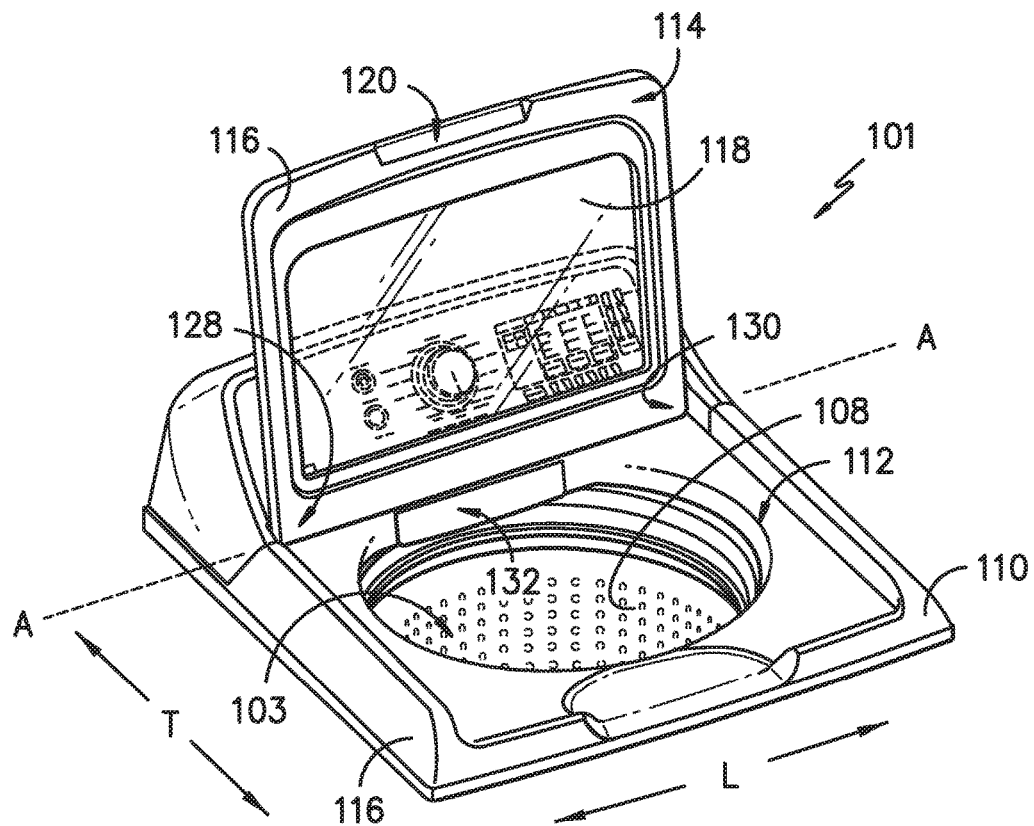
FIG. -2-
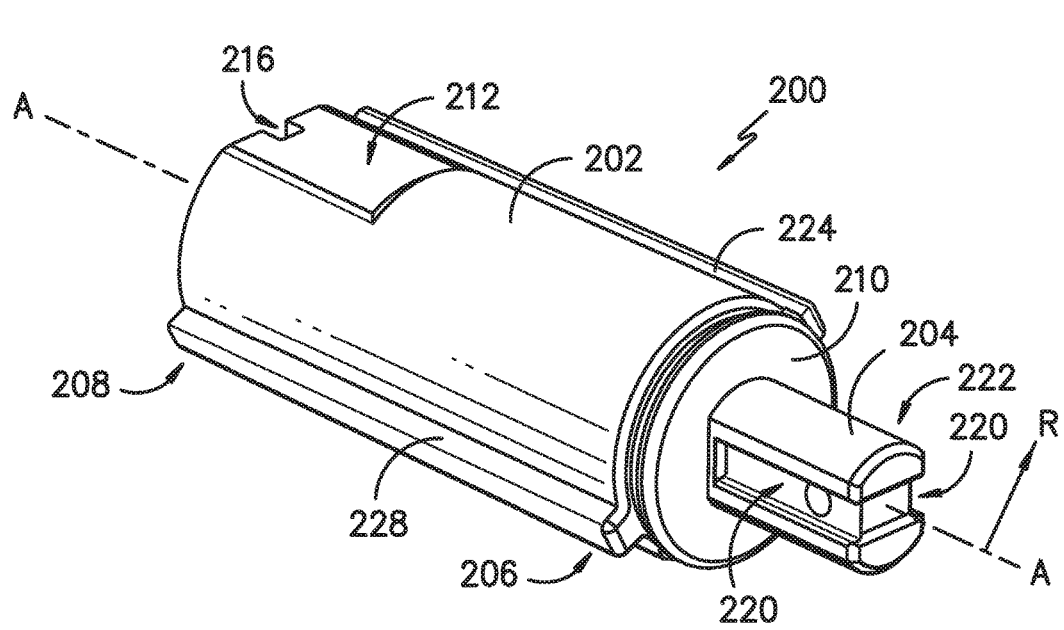
FIG. -3-

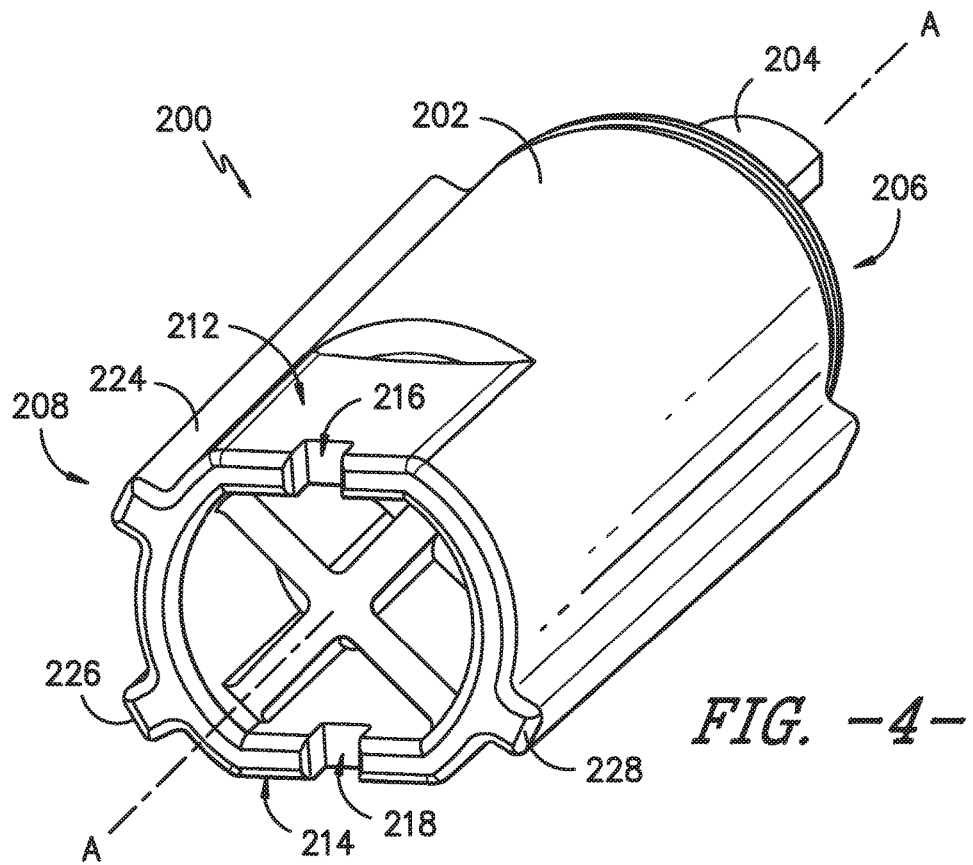
FIG. -4-
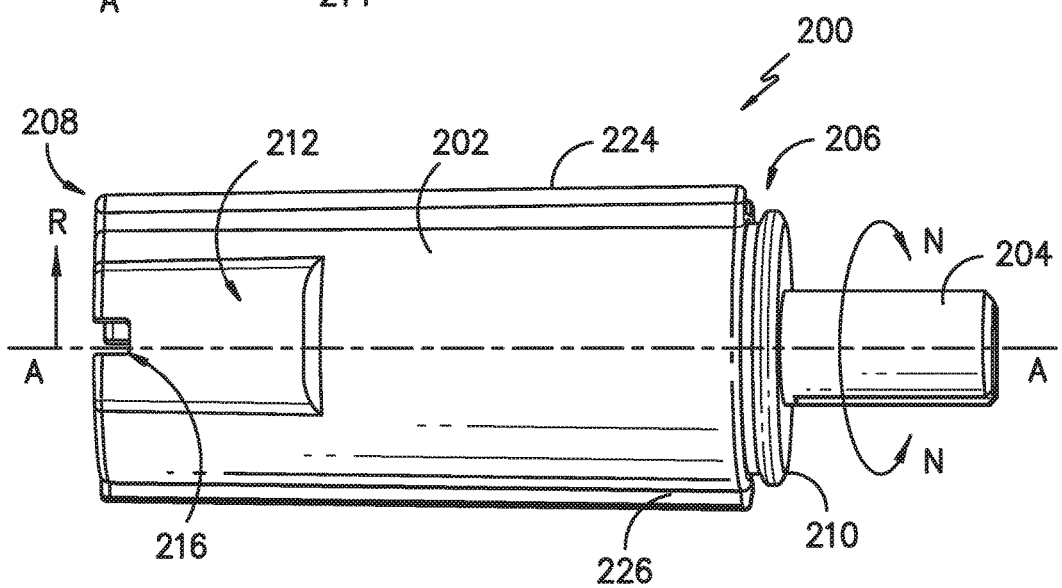
FIG. -5-

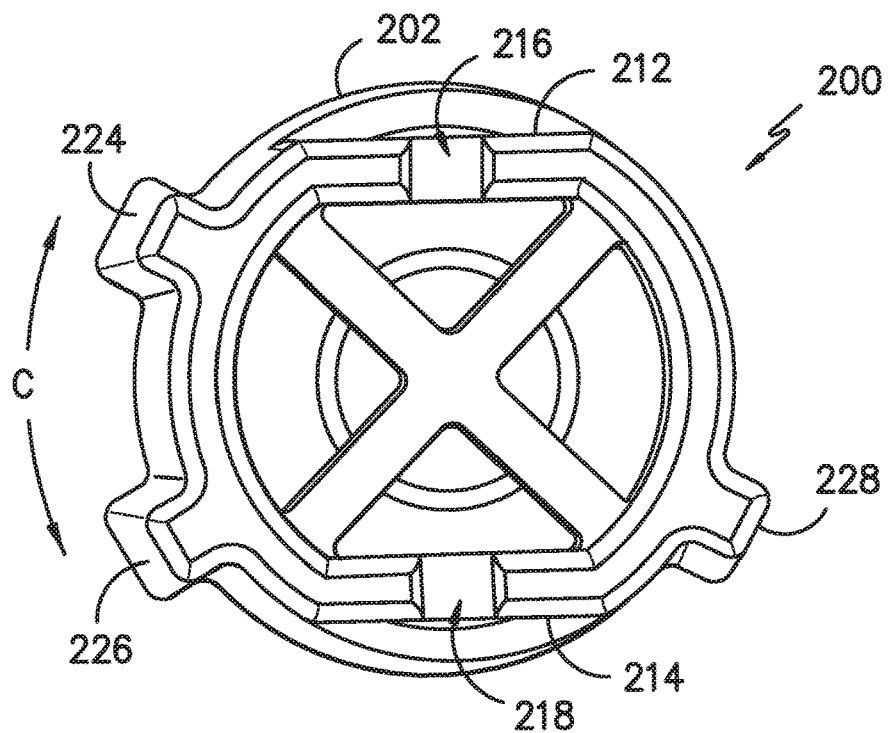
FIG. -6-
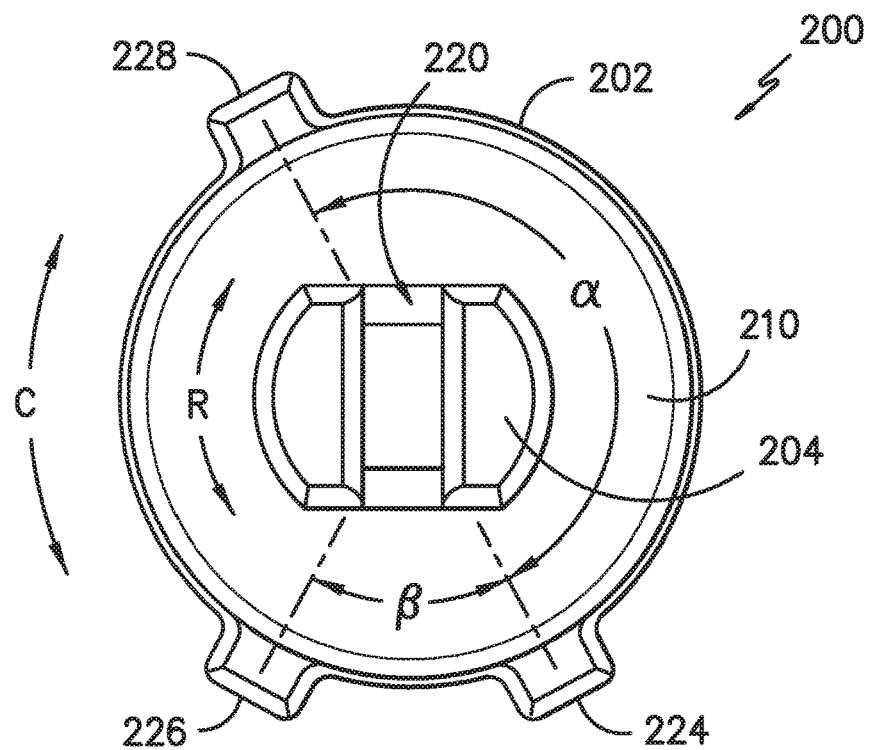
FIG. -7-

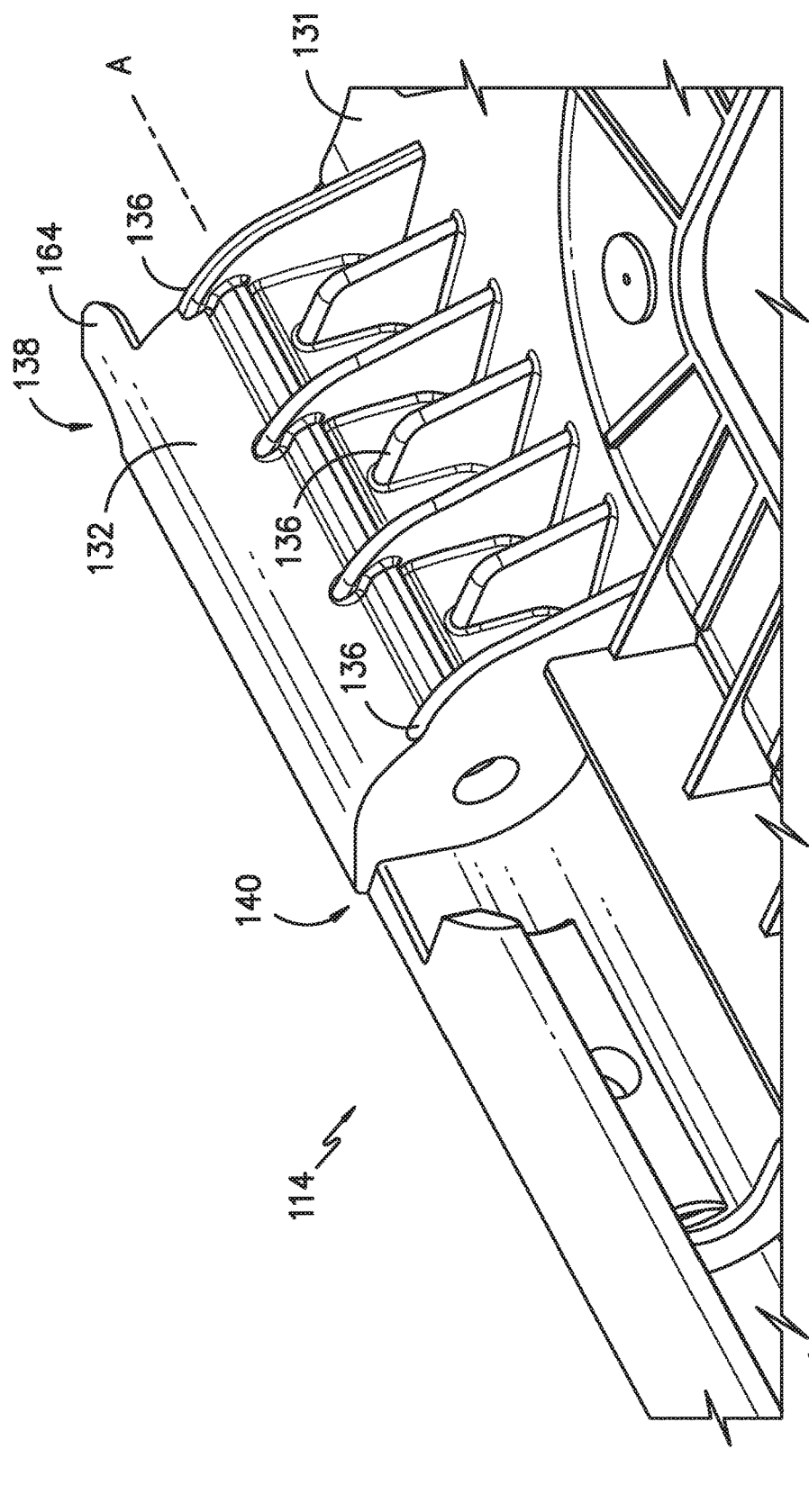
FIG. -8-

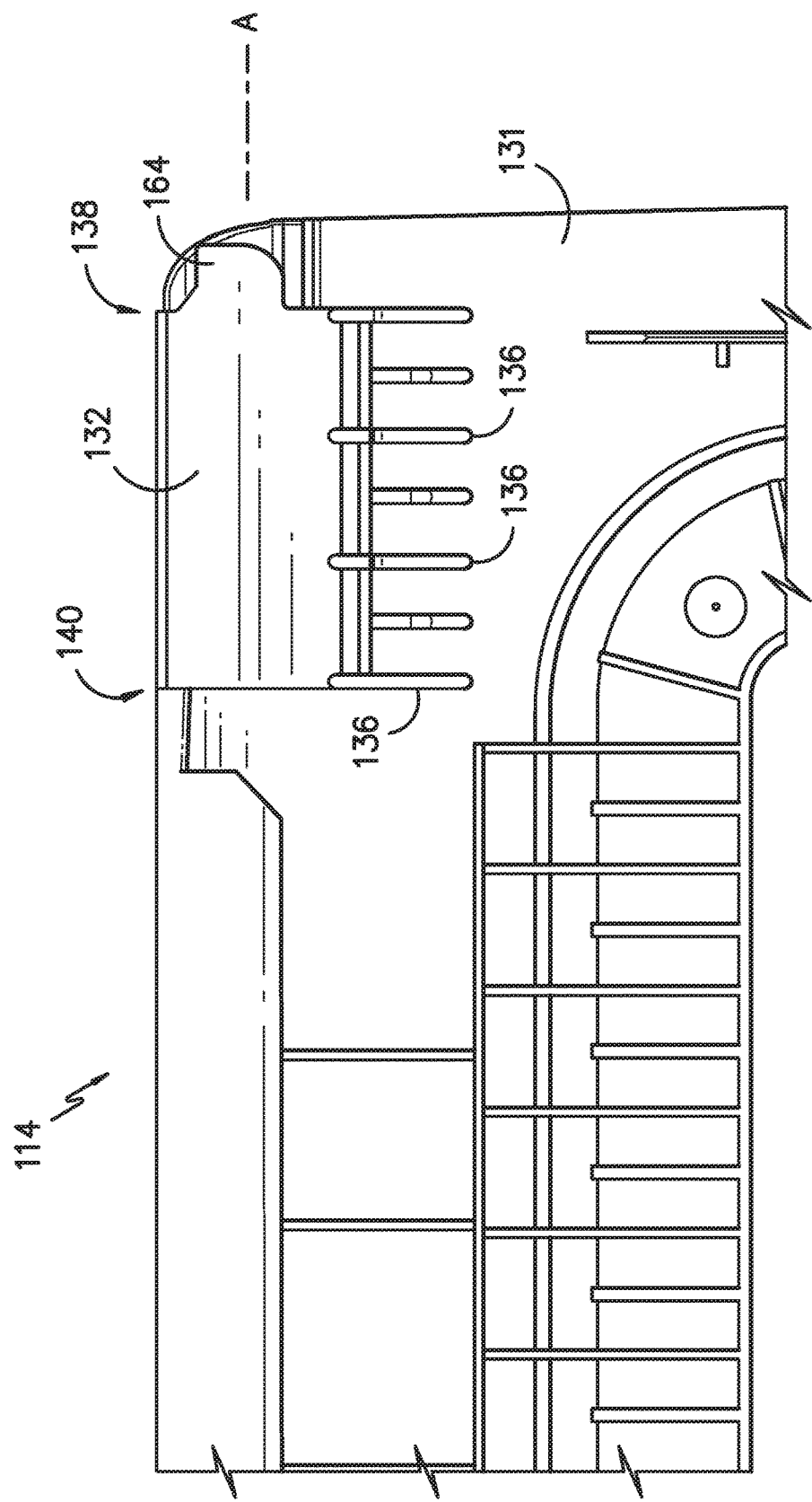

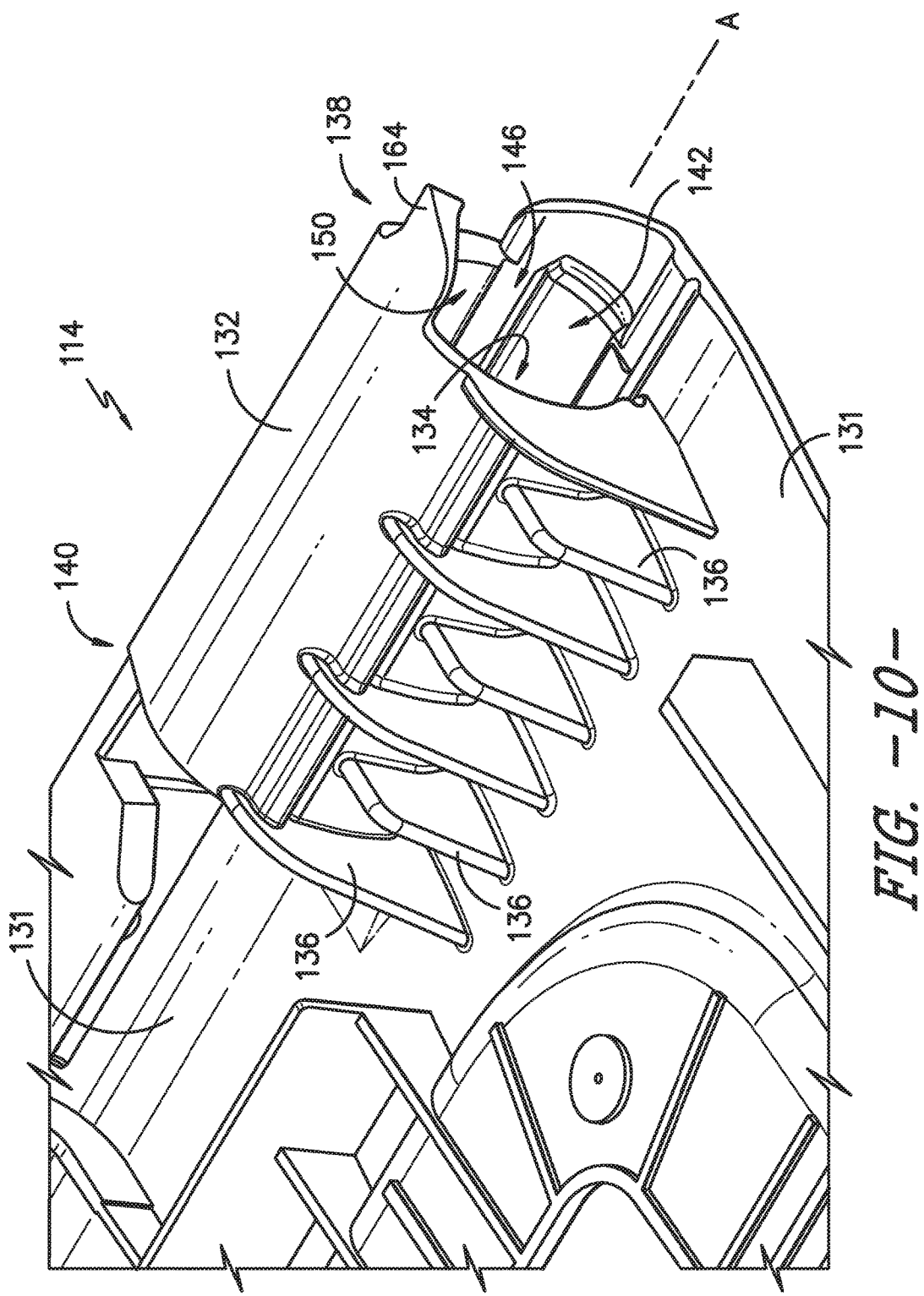

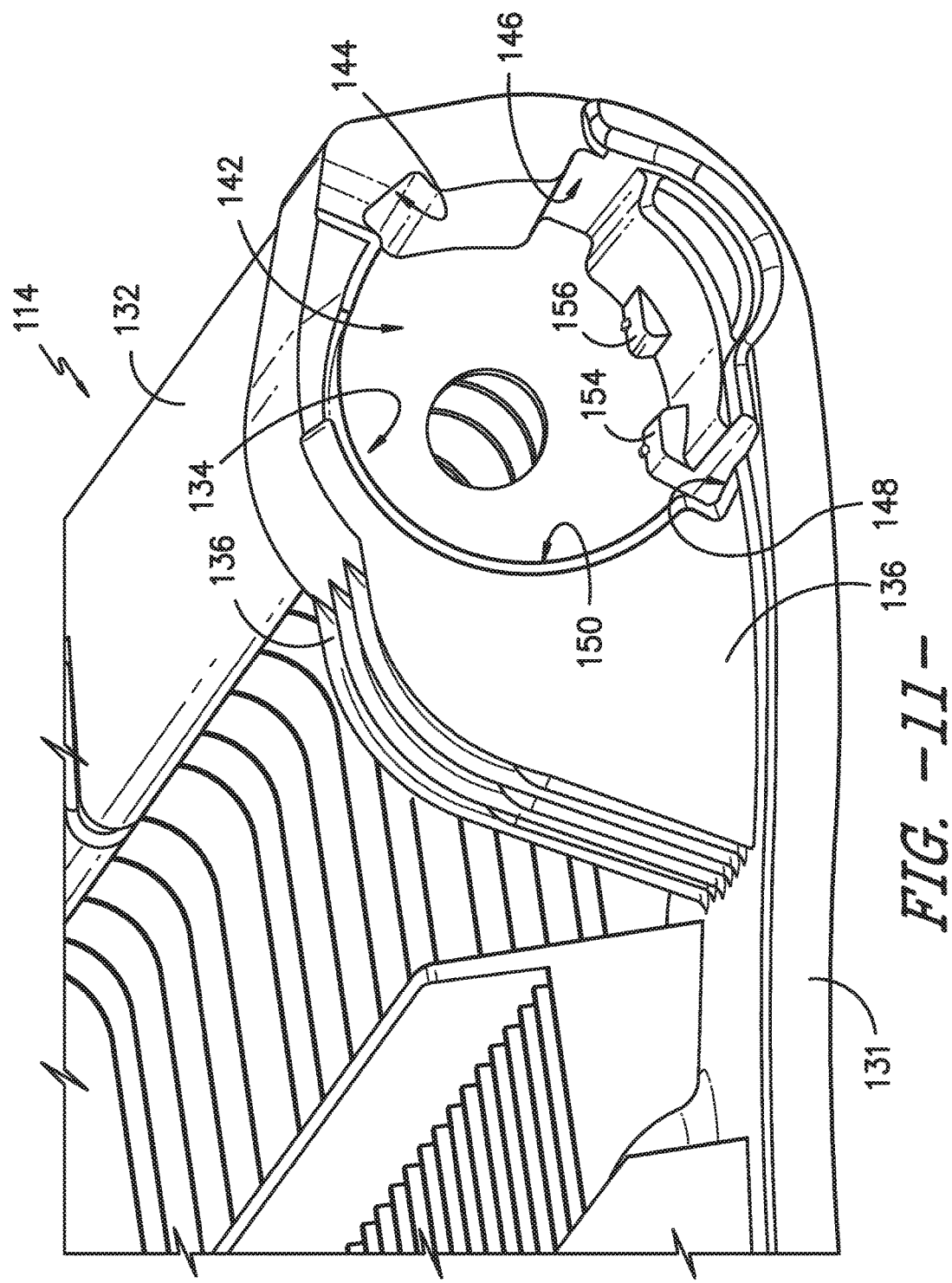

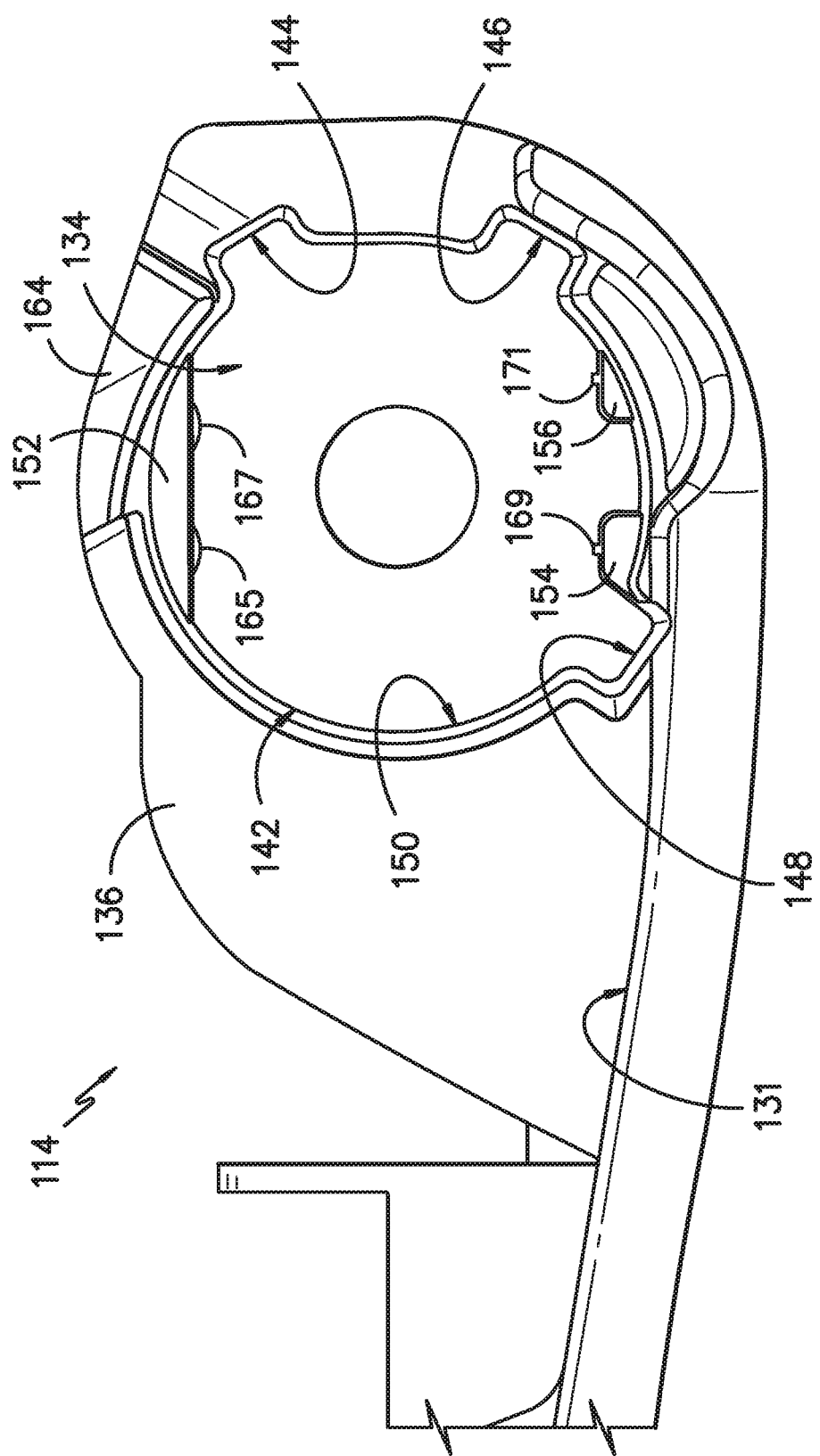

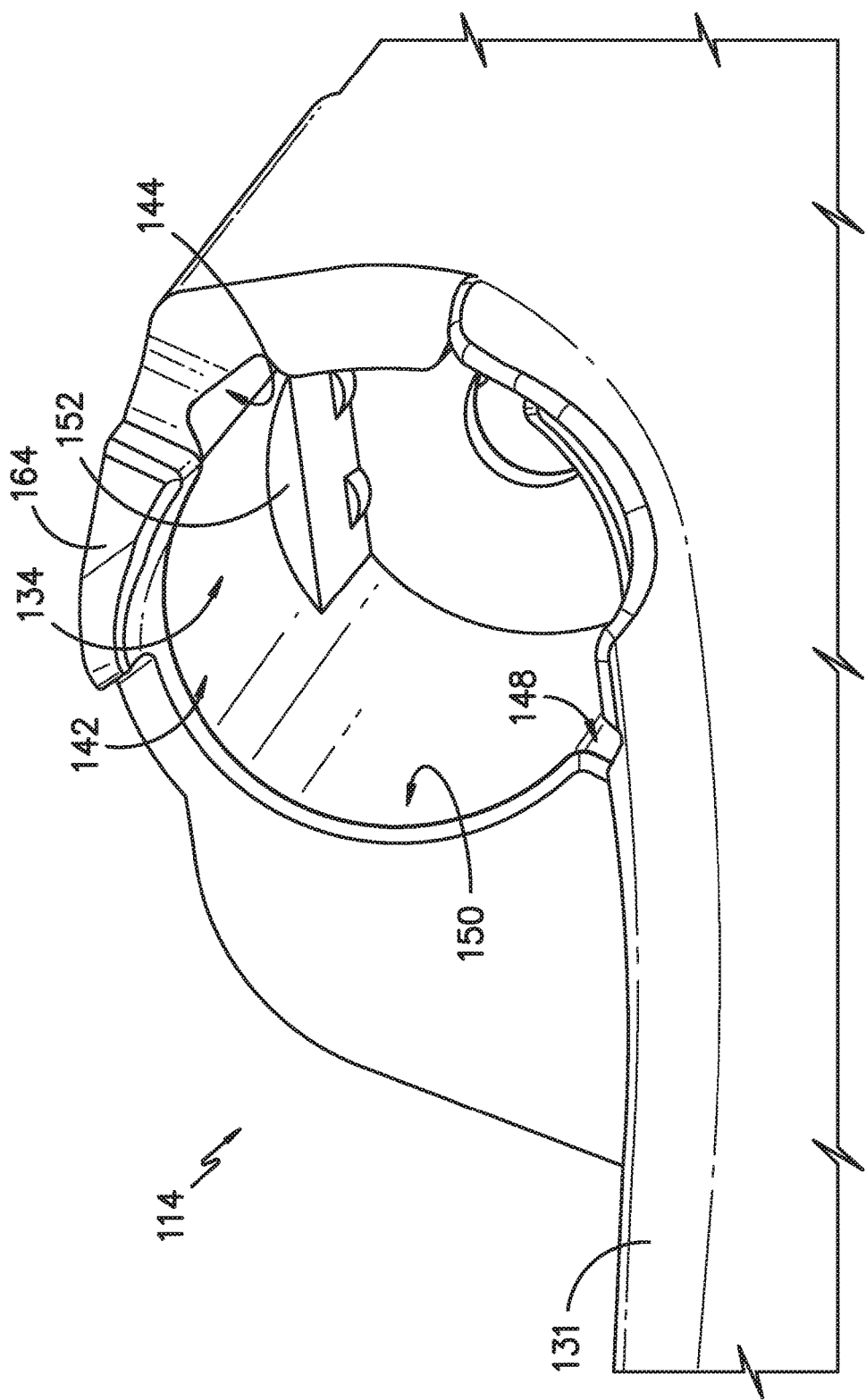

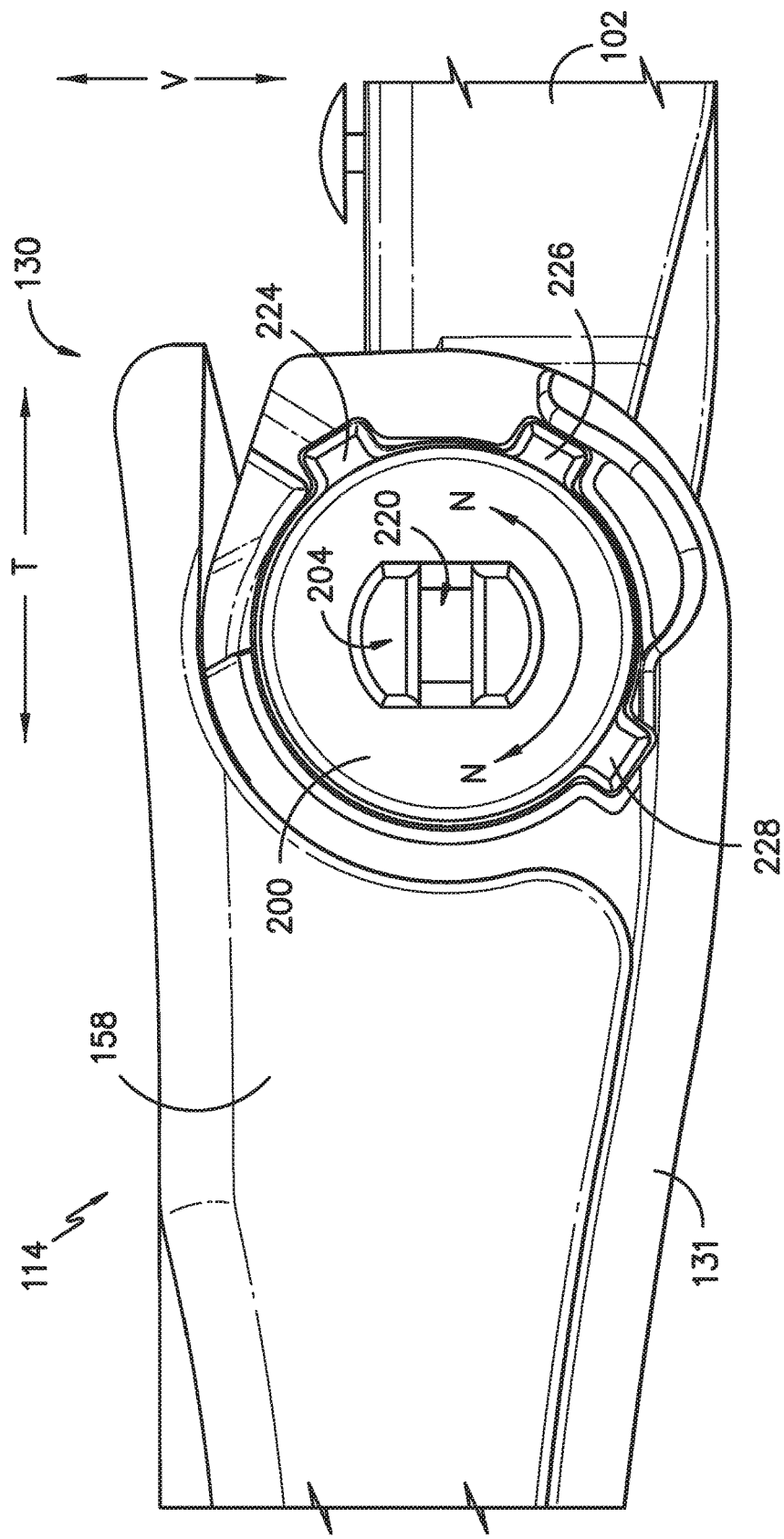
FIG. -14-

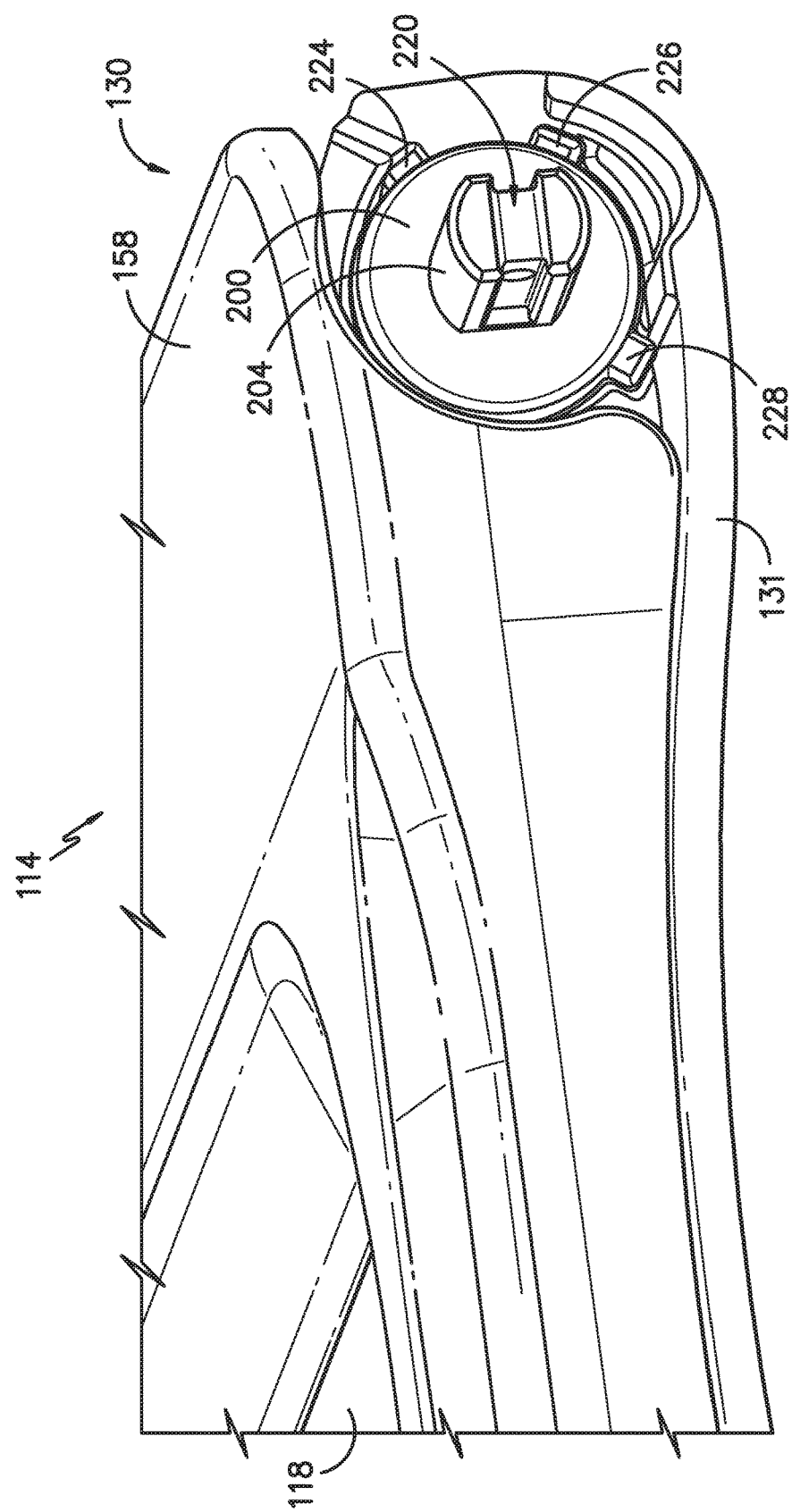

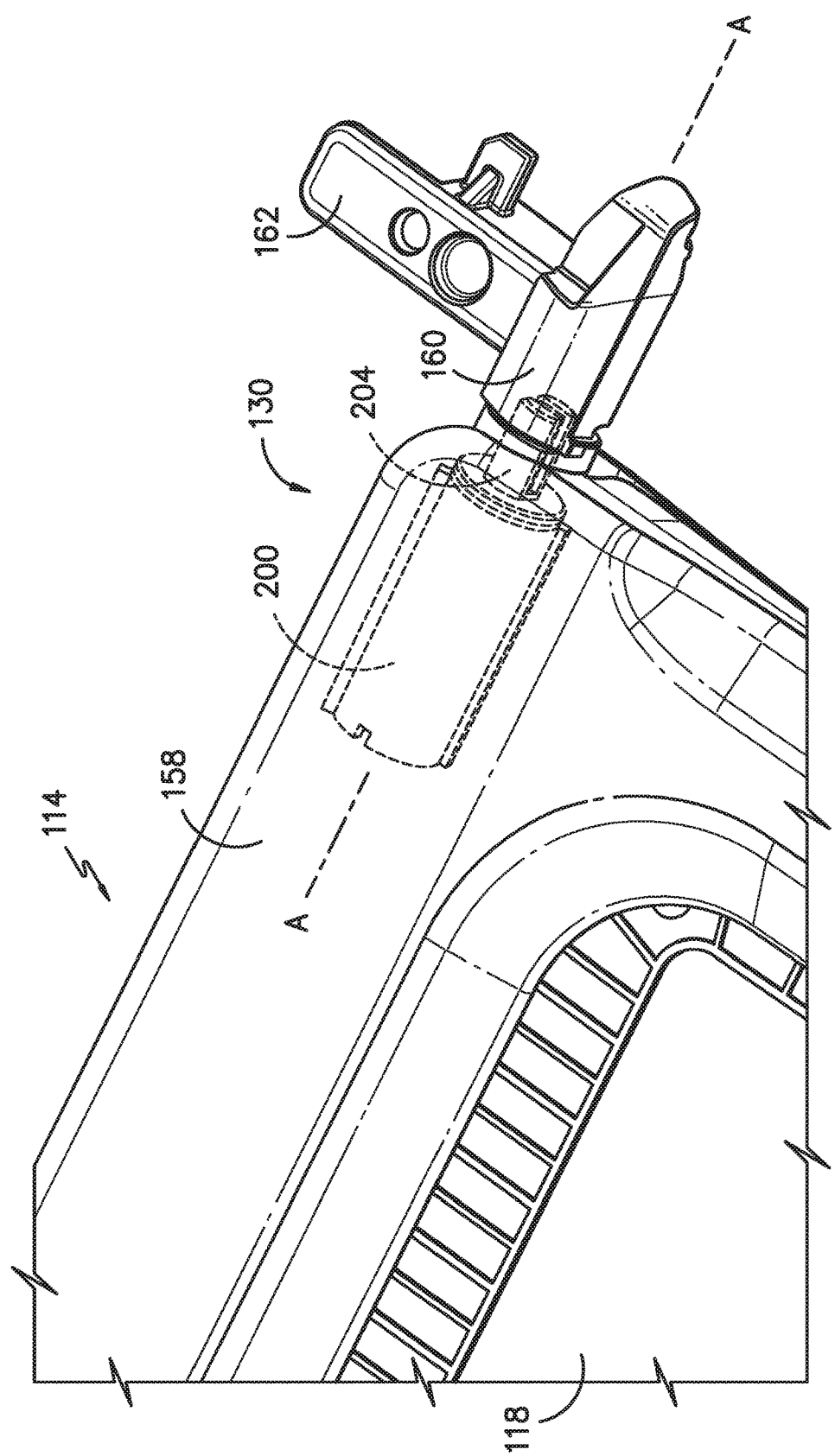
FIG. -16-

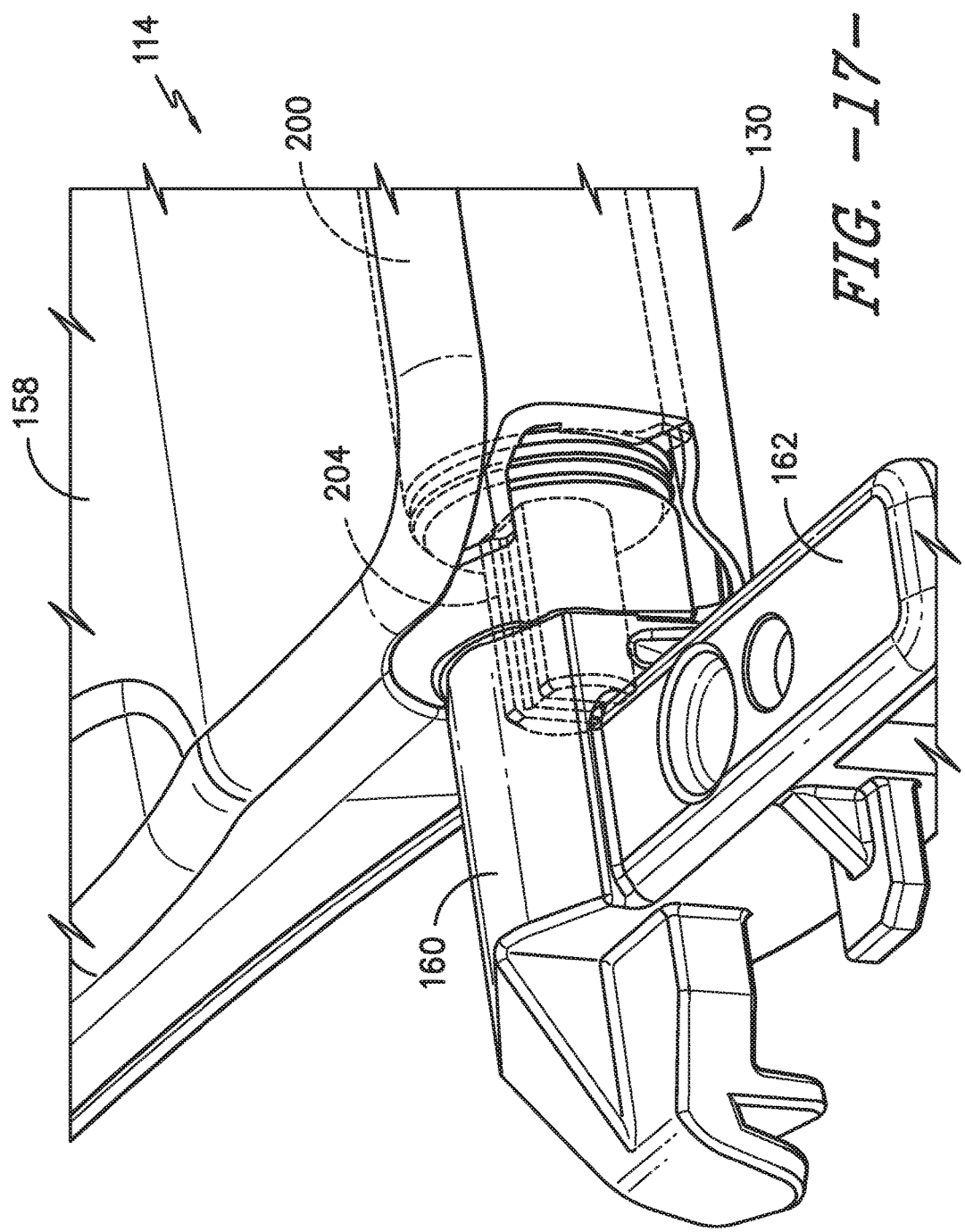
FIG. -17-

US 10,246,922 B2

DAMPENER FOR AN APPLIANCE

FIELD OF THE INVENTION

The subject matter of the present disclosure relates generally to a dampener for an appliance.

BACKGROUND OF THE INVENTION

Appliances such as washing machines, dryers, refrigerators, and others may include one or more doors for providing access to various internal compartments. For example, a top opening wash machine may include a door covering an opening to the wash chamber whereby articles of clothing may be added or removed. During operation, the door remains closed so as to provide sound abatement, contain fluids, and prevent the user from accessing the chamber during a spin mode.

Conventionally, the door may be attached to the appliance through simple, mechanical hinges that allow the door to freely pivot or swing between open and closed positions. Depending upon the location and configuration of the hinges, gravity may assist in moving the door along the pivoting travel path between an open and a closed position. For example, for a top loading washing machine, gravity may pull the door towards a closed position over the wash chamber once the user rotates the door past a certain point. Similarly, over a least a portion of the pivoting travel path, gravity may also assist in moving the door to its fully open position. For example, one the user raises the door to a certain point, the door may fall back towards a user interface on top of the washing machine to a fully open position.

Such simple mechanical hinges commonly do not provide any resistance to the pivoting movement of the door. As such, unless the user carefully controls the movement of the door between the open and closed position, the door may freely drop into position. Depending upon the distance over which the door is allowed to fall, the impact of the door with the rest of the appliance may create an undesirable noise and potentially damage the door or other portions of the appliance.

A potential improvement to the simple mechanical hinge is the use of one or more dampeners in addition, or in place of, such hinges. Such dampeners provide resistance to the movement of the door over its rotational or pivoting travel path thereby preventing the door from falling freely into the open or close position. As such, the dampers can prevent the undesirable noise associated with the falling door and can prevent related damage.

The dampeners may include springs, fluids, or other components to resist the movement of the door. Typically, these components cause the dampener to be much larger in size relative to a simple mechanical hinge. In addition, more than one dampener may be required to properly control the movement of the door.

In order to provide consumer appeal, the design of an appliance includes consideration of aesthetics—particularly for those portions of the appliance readily visible during use. For example, streamlined shapes for the overall appliance including the door can be desirable to consumers. The incorporation of materials such as plastics that can provide needed strength and desired shapes while also reducing bulk and weight is also desirable. Unfortunately, placing the dampeners in locations where such are readily visible to the consumer may detract from the aesthetics of the appliance and, therefore, consumer appeal. The dampeners tend to be somewhat bulky components that can interrupt otherwise streamlined shapes and surfaces of the appliance.

Accordingly, an appliance having a door provided with one or more dampeners for controlling the movement of the door would be useful. Such an appliance in which the dampeners are hidden from user view by being incorporated within other portions of the appliance would be beneficial. Incorporating one or more dampeners in a manner that provides the necessary strength for repeated operation of the door would be particularly helpful. Dampeners that can be used and incorporated in such an appliance would also be very useful.

BRIEF DESCRIPTION OF THE INVENTION

The present invention provides a dampener, and an appliance with a dampener, wherein the dampener provides resistance against the movement of a door of the appliance between an open and closed position. The dampener can be incorporated into the door of the appliance in manner than provides the requisite strength for proper operation while also allowing for streamlined aesthetics and less bulk. Additional aspects and advantages of the invention will be set forth in part in the following description, or may be apparent from the description, or may be learned through practice of the invention.

In one exemplary embodiment, the present invention provides an appliance defining at least one compartment. The appliance includes a door attached to the appliance and configured for pivoting movement about an axis of rotation between i) an open position where a user can access the compartment through an opening defined by the appliance and ii) a closed position whereby the door precludes access to the compartment through the opening. The door defines a chamber. A bushing is positioned adjacent to the chamber of the door. At least one dampener is received into the chamber and is configured for providing resistance against the pivoting movement of the door about the axis of rotation between the open position and the closed position. The dampener includes a dampener housing and at least three ribs positioned on an exterior of the dampener housing and extending parallel to the axis of rotation. The three ribs are spaced apart from each other about the exterior. A shaft extends from the dampener housing and is received into the bushing. The shaft is rotatable about the axis of rotation.

In another exemplary embodiment, the appliance provides a cabinet that includes at least one compartment. A door is attached to the appliance and is configured for rotating between an open position and a closed position to provide selective access to the compartment. The door has a pair of corners, wherein at each corner the appliance includes a chamber housing defining a chamber therein and includes a dampener assembly. Each dampener assembly includes a dampener positioned in the chamber. The dampener includes a dampener housing. At least three ribs are positioned on an exterior of the dampener housing and extend parallel to each other. The three ribs are spaced apart from each other about the exterior. A shaft extends from the dampener and is rotatable about an axis of rotation. A bushing is attached to the cabinet and is configured for receipt of the shaft. The dampener assembly is configured for providing resistance against rotating movement of the door about the axis of rotation between the open position and the closed position.

In still another embodiment, the present invention includes a dampener for an appliance having a door configured for pivoting movement between an open position and a closed position. The door defines a chamber adjacent to a bushing. The dampener includes a dampener housing configured for receipt into the chamber. At least three ribs are positioned on an exterior of the dampener housing and extend parallel to the axis of rotation. The three ribs are spaced apart from each other about the exterior. A shaft extends from the dampener housing and is configured for receipt into the bushing. The shaft is rotatable about the axis of rotation and provides a resistance against such rotation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of an exemplary embodiment of an appliance of the present invention.

FIG. 2 is a view of a top portion of the exemplary appliance of FIG. 1.

FIG. 3 is a perspective view of an exemplary embodiment of a dampener of the present invention.

FIG. 4 provides another perspective view of the exemplary dampener of FIG. 3.

FIG. 5 provides a side view of the exemplary dampener of FIG. 3.

FIG. 6 is an end view of the exemplary dampener of FIG. 3.

FIG. 7 is another end view of the exemplary dampener of FIG. 3 on an end opposite from the end shown in FIG. 6.

FIG. 8 is a perspective view of one corner of a bottom portion of an exemplary door for the appliance of FIG. 1.

FIG. 9 illustrates a top view of the corner shown in FIG. 8.

FIG. 10 is another perspective view of the corner shown in FIG. 8.

FIGS. 11, 12, and 13 are various side views of the corner shown in FIG. 8.

FIGS. 14 and 15 are side views of the exemplary door of FIG. 1 along the same corner as shown in FIG. 8 and with a dampener shown in position.

FIGS. 16 and 17 illustrate top and rear views, respectively, of the exemplary door of FIG. 1 along the same corner as shown in FIG. 8.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates an exemplary embodiment of a vertical axis washing machine appliance 100 while FIG. 2 illustrates a top portion 101 thereof. FIGS. 1 and 2 will be used in describing exemplary embodiments of the present invention. However, as will be understood by one or ordinary skill in the art using the teachings disclosed herein, the present invention is not limited to use with a washing machine appliance. Instead, the present invention may be used with other appliances having a door for which use of one or more dampeners is intended.

Washing machine appliance 100 generally defines a vertical direction V, a lateral direction L, and a transverse direction T, each of which is mutually perpendicular, such that an orthogonal coordinate system is generally defined. Washing machine appliance 100 has a cabinet 102 that extends between a top portion 104 and a bottom portion 106 along the vertical direction V. A wash basket 108 is rotatably mounted within cabinet 102. A motor (not shown) is in mechanical communication with wash basket 108 to selectively rotate wash basket 108 e.g., during an agitation, spin, or rinse cycle of washing machine appliance 100.

Wash basket 108 is received within a compartment 103 referred to as a wash tub or wash chamber and is configured for receipt of articles for washing. The wash tub holds wash and rinse fluids for agitation in wash basket 108 within the wash tub. An agitator or impeller may (not shown) extend into wash basket 108 and is also in mechanical communication with the motor. The impeller assists agitation of articles disposed within wash basket 108 during operation of washing machine appliance 100.

Cabinet 102 of washing machine appliance 100 has a top panel 110. Top panel 110 defines an opening 112 (FIG. 2) that permits user access to wash basket 108 of the wash tub. A door 114 is rotatably attached to top panel 110 and has a pair of opposing, parallel sides separated from each other along the lateral direction F. Door 114 permits selective access to opening 112. More specifically, door 114 is configured for rotational or pivoting movement between the closed position shown in FIG. 1 and the open position shown in FIG. 2. In the open position, a user can access the compartment 103 or wash chamber that contains wash basket 108 so as to e.g., add or remove articles of clothing. In the closed position, the user is precluded from access to the compartment 103 containing wash basket 108. As will be more fully described herein, door 114 can pivot about an axis of rotation A-A between open and closed positions using dampener assemblies positioned within door 114 and top panel 110 near opposing corners 128 and 130 of door 114 (FIG. 2). For this exemplary embodiment, the axis of rotation A-A is horizontal or parallel to lateral direction L.

Door 114 includes a frame 116 surrounding a glass panel 118 through which the user can view wash basket 108 and articles of clothing placed therein. The present invention is not limited to this particular construction for door 106 and others may be used as well. For example, door 114 may be provided without glass panel 118. Door 114 can also include a recessed handle 120 (FIG. 2) whereby a user may contact door 114 when opening and closing. Although door 114 is illustrated as mounted to top panel 110, in alternative embodiments door 114 may be mounted e.g., directly to cabinet 102 or other suitable support.

A control panel 122 with at least one input selector 124 (FIG. 1) extends from top panel 110. Control panel 122 and input selector 124 collectively form a user interface for selection of various appliance cycles and features. A display 126 on control panel 110 indicates selected features, operation mode, a countdown timer, and/or other items of interest to appliance users regarding operation.

Operation of washing machine appliance 100 is controlled by a controller or processing device (not shown) that is operatively coupled to control panel 122 for user manipulation in selecting washing machine cycles and features. In response to user manipulation of control panel 122, the controller operates the various components of washing machine appliance 100 to execute selected cycles and features. The controller may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 100 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 122 and other components of washing machine appliance 100 may be in communication with the controller via one or more signal lines or shared communication busses.

During operation of washing machine appliance 100, laundry items are loaded into wash basket 108 through opening 112, and washing operation is initiated through operator manipulation of e.g., input selector 124. Wash basket 108 is filled with water and detergent and/or other fluid additives using e.g., an additive dispenser (not shown). One or more valves can be controlled by washing machine appliance 100 to provide for filling wash basket 108 to the appropriate level for the amount of articles being washed and/or rinsed. By way of example for a wash mode, once wash basket 108 is properly filled with fluid, the contents of wash basket 108 can be agitated (e.g., with an impeller as discussed previously) for washing of laundry items in wash basket 108.

After the agitation phase of the wash cycle is completed, wash basket 108 can be drained. Laundry articles can then be rinsed by again adding fluid to wash basket 108 depending on the specifics of the cleaning cycle selected by a user. The impeller may again provide agitation within wash basket 108. One or more spin cycles also may be used. In particular, a spin cycle may be applied after the wash cycle and/or after the rinse cycle to wring wash fluid from the articles being washed. During a spin cycle, wash basket 108 is rotated at relatively high speeds. After articles disposed in wash basket 108 are cleaned and/or washed, the user can remove the articles from wash basket 108, e.g., by raising door 114 and reaching into wash basket 108 through opening 112.

FIGS. 3, 4, 5, and 6 provide various views of an exemplary dampener 200 of the present invention. As shown, dampener 200 includes a dampener housing 202 from which a rotatable shaft 204 extends. Shaft 204 is rotatable in either direction (arrows N-N, which denote clockwise and counter-clockwise) about axis of rotation A-A (FIGS. 2 and 5). Dampener housing 202 has a first end 206 and a second end 208 that are opposed to each other along an axial direction parallel to axis of rotation A-A. Shaft 204 extends through a plate 210 ultrasonically welded at first end 206 to dampener housing 202. Shaft 204 defines a groove 220 extending axially along each side of shaft 204 and across the end 222 of shaft 204.

Dampener housing 202 defines a pair of planar walls 212 and 214 positioned directly opposite to each other along a direction orthogonal to the axis of rotation A-A. Each wall 212 and 214 provides a flat surface for positioning dampener 200 at a specific orientation within door 114 as will be further described. Wall 212 defines a notch 216 while wall 214 defines an opposing notch 218. As with walls 212 and 214, notches 216 and 218 are opposite to each other along a direction orthogonal to the axis of rotation A-A.

For this exemplary embodiment, dampener 200 includes a plurality of ribs 224, 226 and 228 projecting along radial direction R (FIG. 3) from chamber housing 132 and extending along the length of dampener 200 in a manner parallel to the axis of rotation A-A. Ribs 224, 226, and 228 have a square-like cross section and may be formed integrally with housing 132. As best seen in FIGS. 6 and 7, ribs 224, 226, and 228 are spaced apart from each other along the circumferential direction C of dampener 200. In one exemplary embodiment, ribs 224 and 228 are on opposing sides of dampener 200 forming an angle α of about 180 degrees (±10 degrees) from each other while rib 226 forms an angle β of about 45 degrees (±10 degrees) with rib 224. Other angles for angle α and angle β may be used as well. Other cross-sectional shapes for ribs 224, 226, and 228 may also be employed.

For this exemplary embodiment, ribs 224, 226, and 228 are linear in a direction parallel to axis of rotation A-A. However, in other embodiments, 224, 226, and 228 could have non-linear configurations. For example, 224, 226, and 228 could have a cork-screw or spiral shape. In such case, dampener 200 would be twisted as it is inserted into chamber 134 that will now be described.

FIGS. 8, 9, 10, 11, 12, and 13 provide various views of a base portion 131 of door 114 (also shown in FIG. 2). Door 114 includes a chamber housing 132 defining chamber 134 for receipt of dampener 200. In certain exemplary embodiments, chamber housing 132 may be formed integrally with door 114. For example, door 114 and chamber housing 132 may be molded from various plastic materials.

In order to strengthen chamber housing 132, a plurality of braces 136 of alternating heights along vertical direction V extend between base portion 131 of door 114 and chamber housing 132. As shown, braces 136 are positioned adjacent to each other along the axial direction defined by axis of rotation A-A and are also spaced apart along the axial direction. Braces 136 provide strength against torsional forces transmitted to chamber housing 132 by dampener 200 during the opening and closing of door 114. As with chamber housing 132, braces 136 may be formed integrally with door 114. Chamber housing 132 also includes a detent 164 the protrudes along the axial direction away from door 114.

For this exemplary embodiment, chamber 134 is cylindrically-shaped and includes various features for receipt of dampener 200. For example, an interior surface 150 of chamber 134 defines a plurality of grooves 144, 146, and 148 configured for complementary receipt of ribs 224, 226, and 228 on dampener 200. Grooves 144, 146, and 148 extend longitudinally along the axial direction defined by axis of rotation A-A. Each groove 144, 146, and 148 extends between a first end 138 and a second end 140 of chamber 134. First end 138 is separated along the axial direction from second end 140. First end 138 includes an opening 142 by which dampener 200 can be inserted into chamber 134. Interior surface 150 of chamber 134 defines multiple detents 152, 154, and 156 near second end 140 which help secure dampener 200 in chamber 134. In addition, tabs 165, 167, 169, and 171 on interior surface 150 provide an interference fit that assists with holding dampener 200 in place during installation.

During installation, ribs 224, 226, and 228 are aligned with grooves 144, 146, and 148 and then slid thereon as dampener 200 is pushed along the axial direction defined by axis of rotation A-A and into chamber 134 of the base portion 131 of door 114. FIGS. 14 and 15 provide views of corner 130 of door 114 with a top portion 158 attached to bottom portion 131 to form door 114. Once within chamber 134, ribs 224, 226, and 228 interact with grooves 144, 146, and 148 to prevent rotation of dampener 200 as door 114 is raised or lowered. Dampener 200 can include springs, fluids, or other internal features that allow shaft 204 to rotate clockwise or counter-clockwise (arrows N-N in FIG. 14) but with resistance so as to slow the movement of door 114 between the open and closed positions. The design of dampener 200 also provides for a streamlined profile for door 114 shown, for example, in FIGS. 14 and 15. More particularly, the design of dampener 200 enables using smoother, less bulky features at the corners 128, 130 of door 114—thereby increasing the overall aesthetic appeal of appliance 100.

As shown in FIGS. 16 and 17, a dampener assembly 250 includes dampener 200 and bushing 160. End 222 of shaft 204 is inserted into a bushing 160 adjacent to dampener 200, which is turn is attached to cabinet 102 of appliance 100 using base 162. As door 114 is raised and lowered, features of bushing 160 interact with shaft 204 to hold shaft 204 stationary relative to bushing 160 while dampener housing 202 is held stationary relative to cabinet 102. Similarly, the interaction of ribs 224, 226, and 228 with grooves 144, 146, and 148 prevents dampener housing 202 from rotating relative to chamber housing 132 within chamber 134.

Accordingly, shaft 204 is forced to rotate within dampener housing 202 as door 114 is raised or lowered and thereby imparts a torsional resistance that slows the pivoting movement of door 114 about axis of rotation A-A between the open and closed positions. For this embodiment, one dampener assembly 250 is associated with each corner 128 and 130 of door 114. Other configurations may use only a single dampener 200 or more than two dampeners 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance defining at least one compartment, the appliance comprising:
    a door attached to the appliance and configured for pivoting movement about an axis of rotation between i) an open position where a user can access the compartment through an opening defined by the appliance and ii) a closed position whereby the door precludes access to the compartment through the opening, the door defining a chamber;
    a bushing positioned adjacent to the chamber of the door;
    at least one dampener received into the chamber and configured for providing resistance against the pivoting movement of the door about the axis of rotation between the open position and the closed position, the dampener comprising
        a dampener housing comprising a first end and a second end that oppose each other along an axial direction parallel to the axis of rotation, the shaft positioned at the first end, the dampener housing defining a pair of opposing, planar walls positioned near the second end, the dampener housing defining a pair of opposing notches, each notch positioned at the second end of the dampener housing within one of the planar walls;
        at least three ribs positioned on an exterior of the dampener housing and extending parallel to the axis of rotation, the three ribs spaced apart from each other about the exterior; and
        a shaft extending from the dampener housing and received into the bushing, the shaft rotatable about the axis of rotation.

2. The appliance of claim 1, wherein the chamber includes a plurality of grooves extending parallel to the axis of rotation and configured for complementary receipt of the at least three ribs.

3. The appliance of claim 1, wherein the chamber includes a first end having an opening for insertion of the dampener and has a second end separated along the axis of rotation from the first end, wherein an interior surface of the chamber defines multiple detents extending into the chamber near the second end and configured for contact with the opposing, planar walls of the dampener housing.

4. The appliance of claim 3, wherein the appliance defines vertical, lateral, and transverse directions, and wherein the door includes a pair of opposing sides separated from each other along the lateral direction, and wherein the opening of the chamber is positioned along one of the opposing sides.

5. The appliance of claim 4, wherein the chamber is defined by a chamber housing formed integrally with the door.

6. The appliance of claim 5, further comprising a plurality of braces positioned adjacent to each other and spaced apart along the lateral direction, the braces attached to the door and to the chamber housing.

7. The appliance of claim 6, wherein the braces are formed integrally with the door and the chamber housing.

8. A dampener for an appliance having a door configured for pivoting movement between an open position and a closed position, the door defining a chamber adjacent to a bushing, the dampener comprising:
    a dampener housing configured for receipt into the chamber, the dampener housing comprises a first end and a second end that oppose each other along an axial direction parallel to the axis of rotation, the rotatable shaft extending from the first end, the dampener housing defining a pair of opposing, planar walls positioned near the second end, the dampener housing defines a pair of opposing notches, each notch positioned at the second end of the dampener housing within one of the planar walls;
    at least three ribs positioned on an exterior of the dampener housing and extending parallel to the axis of rotation, the three ribs spaced apart from each other about the exterior; and a shaft extending from the dampener housing and configured for receipt into the bushing, the shaft rotatable about the axis of rotation and providing a resistance against such rotation.

9. The dampener for an appliance as in claim 8, wherein the ribs are formed integrally with the dampener housing.

10. An appliance, comprising:
   a cabinet that includes at least one compartment;
   a door attached to the appliance and configured for rotating between an open position and a closed position to provide selective access to the compartment, the door having a pair of corners, wherein at each corner the appliance includes a chamber housing defining a chamber therein and includes a dampener assembly, wherein the chamber includes a plurality of grooves extending parallel to the axis of rotation and configured for complementary receipt of the at least three ribs of the dampener, and wherein each dampener assembly comprises:
      a dampener positioned in the chamber, the dampener including a dampener housing,
      at least three ribs positioned on an exterior of the dampener housing and extending parallel to each other, the three ribs spaced apart from each other about the exterior,
      a shaft extending from the dampener and rotatable about an axis of rotation; and
      a bushing attached to the cabinet and configured for receipt of the shaft;
      wherein the dampener assembly is configured for providing resistance against rotating movement of the door about the axis of rotation between the open position and the closed position;
   wherein the chamber housing comprises a first end and a second end that oppose each other along an axial direction parallel to the axis of rotation, the rotatable shaft of the dampener positioned at the first end, the dampener housing defining a pair of opposing, planar walls positioned near the second end; the dampener housing also defining a pair of opposing notches, each notch positioned at the second end of the dampener housing within one of the planar walls.

\* \* \* \* \*